(12) United States Patent
Kadowaki (10) Patent No.: US 9,347,516 B2
(45) Date of Patent: May 24, 2016

(54) LIQUID SEALED VIBRATION ISOLATING DEVICE

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/391,963

(22) PCT Filed: Apr. 26, 2013

(86) PCT No.: PCT/JP2013/062370
§ 371 (c)(1),
(2) Date: Oct. 10, 2014

(87) PCT Pub. No.: WO2013/161992
PCT Pub. Date: Oct. 31, 2013

(65) Prior Publication Data
US 2015/0123326 A1    May 7, 2015

(30) Foreign Application Priority Data

Apr. 27, 2012   (JP) .................................. 2012-103900

(51) Int. Cl.
*F16F 13/00*  (2006.01)
*F16F 13/10*  (2006.01)

(52) U.S. Cl.
CPC .................................... *F16F 13/106* (2013.01)

(58) Field of Classification Search
CPC ..... F16F 13/106; F16F 13/105; F16F 13/107; F16F 13/108

USPC ............. 267/140.13, 140.12, 140.11, 140.14, 267/140.15

See application file for complete search history.

(56) References Cited

U.S. PATENT DOCUMENTS 4,647,023 A * 3/1987 Ray ...................... F16F 13/106
                                                      267/140.13
4,711,206 A * 12/1987 Andra ..................... F16F 13/22
                                                      248/636

(Continued)

FOREIGN PATENT DOCUMENTS

| JP | 2009-085313 | 4/2009 |
| JP | 2009-222192 | 10/2009 |
| JP | 2010-101466 | 5/2010 |

*Primary Examiner* — Thomas J Williams
*Assistant Examiner* — Mariano Sy
(74) *Attorney, Agent, or Firm* — Rankin, Hill & Clark LLP (57) ABSTRACT

A relief valve is provided in a central part of an elastic diaphragm. A relief hole is provided in the central part of the relief valve. The relief valve is formed thinner than a main body section on an outer circumferential side thereof. Pressing projections protrude from the relief valve upper surface at predetermined intervals in the circumferential direction. The pressing projections contact a projection support section, and a central opening of a central section is located above the relief hole. During excessive deformation on a negative pressure side, the hydraulic liquid of a secondary liquid chamber allows an inner peripheral portion of the relief valve to cause such a preceding deformation as to be lifted up, and the relief valve is rapidly brought out of contact with the seal section, so that the hydraulic liquid leaks rapidly from the central opening to a primary liquid chamber.

9 Claims, 12 Drawing Sheets

(56) References Cited

U.S. PATENT DOCUMENTS

| | | | | |
|---|---|---|---|---|
| 4,773,634 A * | 9/1988 | Hamaekers | F16F 13/106 | 137/493 |
| 4,796,876 A * | 1/1989 | Sciortino | F16F 13/22 | 267/140.13 |
| 4,974,818 A * | 12/1990 | Kato | F16F 13/108 | 267/140.13 |
| 4,986,510 A * | 1/1991 | Bellamy | F16F 13/106 | 248/636 |
| 4,997,168 A * | 3/1991 | Kato | F16F 13/10 | 248/573 |
| 6,439,556 B1 * | 8/2002 | Baudendistel | F16F 13/106 | 267/140.15 |
| 6,485,005 B1 * | 11/2002 | Tewani | F16F 13/20 | 267/140.13 |
| 6,505,822 B1 * | 1/2003 | Yamamoto | F16F 13/106 | 267/140.13 |
| 6,536,113 B2 * | 3/2003 | Guillemot | F16F 13/107 | 267/140.13 |
| 6,932,332 B2 * | 8/2005 | Thomazeau | F16F 13/106 | 267/140.13 |
| 8,474,800 B2 * | 7/2013 | Okumura | F16F 13/108 | 267/140.13 |
| 8,490,954 B2 * | 7/2013 | Saito | F16F 13/106 | 267/140.13 |
| 2007/0090578 A1 * | 4/2007 | Muraoka | F16F 13/106 | 267/140.11 |
| 2011/0101581 A1 * | 5/2011 | Kubo | F16F 13/106 | 267/140.13 |
| 2013/0001843 A1 * | 1/2013 | Kanaya | F16F 13/106 | 267/140.14 |

* cited by examiner

LIQUID SEALED VIBRATION ISOLATING DEVICE

TECHNICAL FIELD

The present invention relates to a liquid sealed vibration isolating device such as a liquid sealed engine mount and the like, and more particularly, to the device having an effective cavitation control structure.

BACKGROUND ART

A liquid sealed engine mount is publicly known and provides high damping through an orifice communicating between a primary liquid chamber and a secondary liquid chamber. When vibration which applies pressure from the primary liquid chamber is a positive pressure side and the vibration in the reverse direction is a negative pressure side, a conversion of the vibration from the positive pressure side to the negative pressure side at the time of great force input develops the negative pressure temporarily within the primary liquid chamber due to the delay of a return of a hydraulic liquid from the secondary liquid chamber to the primary liquid chamber, whereby to produce bubbles in a hydraulic liquid. When these bubbles burst, there may be cases where a cavitation noise producing an extraordinary noise is created.

As an example of a structure for preventing this cavitation noise, there is publicly known the device of the type that comprises an elastic diaphragm provided in a partition member, a cylindrical relief valve provided in a center of the elastic diaphragm, an axial hole of the cylindrical relief valve being configured to serve as a relief hole, a seal section provided on a support member for supporting a secondary liquid chamber side of the elastic diaphragm so as to contact the relief valve to close the relief hole, and a through hole which opens into the secondary liquid chamber side, being formed around the seal section. In this type of the device, on the positive pressure side, the leak of the hydraulic liquid from the primary liquid chamber to the secondary liquid chamber is prevented by allowing the relief valve to come in close contact with the seal section in such a way as to close the relief hole, while, on the negative pressure side, the relief valve is brought out of contact with the seal section and the hydraulic liquid is allowed to leak from the secondary liquid chamber through the relief hole to the primary liquid chamber, whereby the cavitation is prevented.

PRIOR ART REFERENCE

Patent reference 1: Japanese patent No. 4820792.

DISCLOSURE OF THE INVENTION

Problem to be Solved by the Invention

In the above prior art, the cylindrical relief valve is held between an upper and lower members of the partition member, and the through hole of the upper member is aligned with the relief hole of the relief valve. When the cylindrical portion of the relief valve is compressively deformed relative to the upper member side in a cavitation occurring condition, an end on the secondary liquid chamber side of the relief valve is brought out of contact with the seal section of the lower member thereby to cause a leak of the hydraulic liquid.

However, in the case where the relief valve is formed in a cylindrical shape like this example, the rigidity in an axial direction becomes exceedingly greater. Therefore, the type that the cylindrical portion is compressively deformed in the axial direction takes a long time before starting the leak by the completion of compressive deformation, and a rapid leak is hard to occur. As a result, there is a possibility of causing a time lag and there is a delay in preventing the cavitation.

It is therefore an object of the present invention to prevent timely the occurrence of the cavitation by accomplishing the rapid leak in such a way as to reduce the time lag so as not to cause such delay.

Means for Solving the Problem

In order to achieve the above object, according to a first aspect of the present invention, there is provided a liquid sealed vibration isolating device comprising a liquid chamber being partitioned into a primary liquid chamber and a secondary liquid chamber by a partition member, an orifice being provided in the partition member to communicate between the primary liquid chamber and the secondary liquid chamber, and a relief valve for controlling cavitation being provided in a central portion of an elastic diaphragm which is provided in the partition member, wherein the partition member is integrated by holding the elastic diaphragm between an upper holder and a lower holder, wherein the elastic diaphragm is provided at the center portion thereof with the relief valve and integrally provided at an outer peripheral portion thereof with a main body section for absorbing an internal pressure fluctuation of the primary liquid chamber, and the relief valve is formed thinner than the main body section and has a relief hole at a central section thereof, and wherein the lower holder has a seal section in a lower position of the relief valve, and the seal section comes in close contact with the relief valve to close the relief hole, and, when in a cavitation occurring condition the relief valve is brought out of contact with the seal section to open such that a portion around the relief hole of the relief valve is elastically deformed in such a way as to be lifted up, a hydraulic liquid leaks from the secondary liquid chamber through the relief hole to the primary liquid chamber.

According to a second aspect of the present invention, in addition to the first aspect, pressing projections are protruded integrally from an upper surface of the relief valve at predetermined intervals in a circumferential direction and are pressed on a projection support section which is provided on the upper holder above the relief valve, so as to allow the relief valve to be pressed against the seal section.

According to a third aspect of the present invention, in addition to the first or second aspect, a valve opening restraining portion for preventing excessive deformation of the relief valve at the time of being opened is provided on the upper holder.

According to a fourth aspect of the present invention, in addition to any of the first to third aspects, elastic deformation restraining portions for restraining the main body section of the elastic diaphragm from being elastically deformed greater than a predetermined degree are provided on the upper holder and the lower holder.

According to a fifth aspect of the present invention, in addition to the first aspect, the upper holder comprises an elastic deformation restraining portion for restraining the main body section of the elastic diaphragm from being elastically deformed greater than a predetermined degree, and a single opening being formed as a part of the upper holder which is located above the relief valve and radially inwardly from the elastic deformation restraining portion.

Effects of the Invention

According to the first aspect of the present invention, since the relief valve is formed thinner than the main body section on the outer peripheral side, an inner circumferential portion of the relief valve is allowed to cause such a preceding deformation as to be lifted up, so that the whole relief valve can be opened rapidly. Therefore, the time lag from the cavitation occurring condition to the start of leak is reduced, whereby the cavitation can be assuredly prevented without delay in timing.

According to the second aspect of the present invention, by the provision of the pressing projections, the close contact of the relief valve with the seal section is maintained, thereby to make it possible to prevent the leak at the time of vibration input on the positive pressure side, and not to serve as the resistance to the preceding deformation at the time of relief. Moreover, when the normal vibration is inputted, even though the main body section is elastically deformed to absorb the internal pressure fluctuation, the relief valve is not deformed following the main body section but makes a close contact with the seal section whereby the closed condition can be maintained.

According to the third aspect of the present invention, the excessive deformation of the relief valve at the time of being opened is prevented by the valve opening restraining portion provided on the upper holder. Therefore, it is possible to prevent the excessive deformation of the relief valve at the time of being opened, whereby the return to the closed position can be performed rapidly. In addition, since the excessive deformation is prevented, the relief valve is configured to be more flexible so that it can be opened rapidly.

According to the fourth aspect of the present invention, since the elastic deformation restraining portions for restraining the main body section of the elastic diaphragm from being elastically deformed greater than the predetermined degree are provided on the upper holder and the lower holder, the main body section is not elastically deformed greater than the predetermined degree. As a result, even though the relief valve is provided integral with the main body section, it does not have an influence on the closed condition of the relief valve, and the closed condition can be stabilized.

According to the fifth aspect of the present invention, although the upper holder has the elastic deformation restraining portion arranged above the main body section, the single opening is provided above the relief valve in such a way as to free the relief valve. Therefore, the relief valve can be rapidly opened without the resistance at the time of the leak of the relief valve.

BEST MODE FOR CARRYING OUT THE INVENTION

Figure 1:
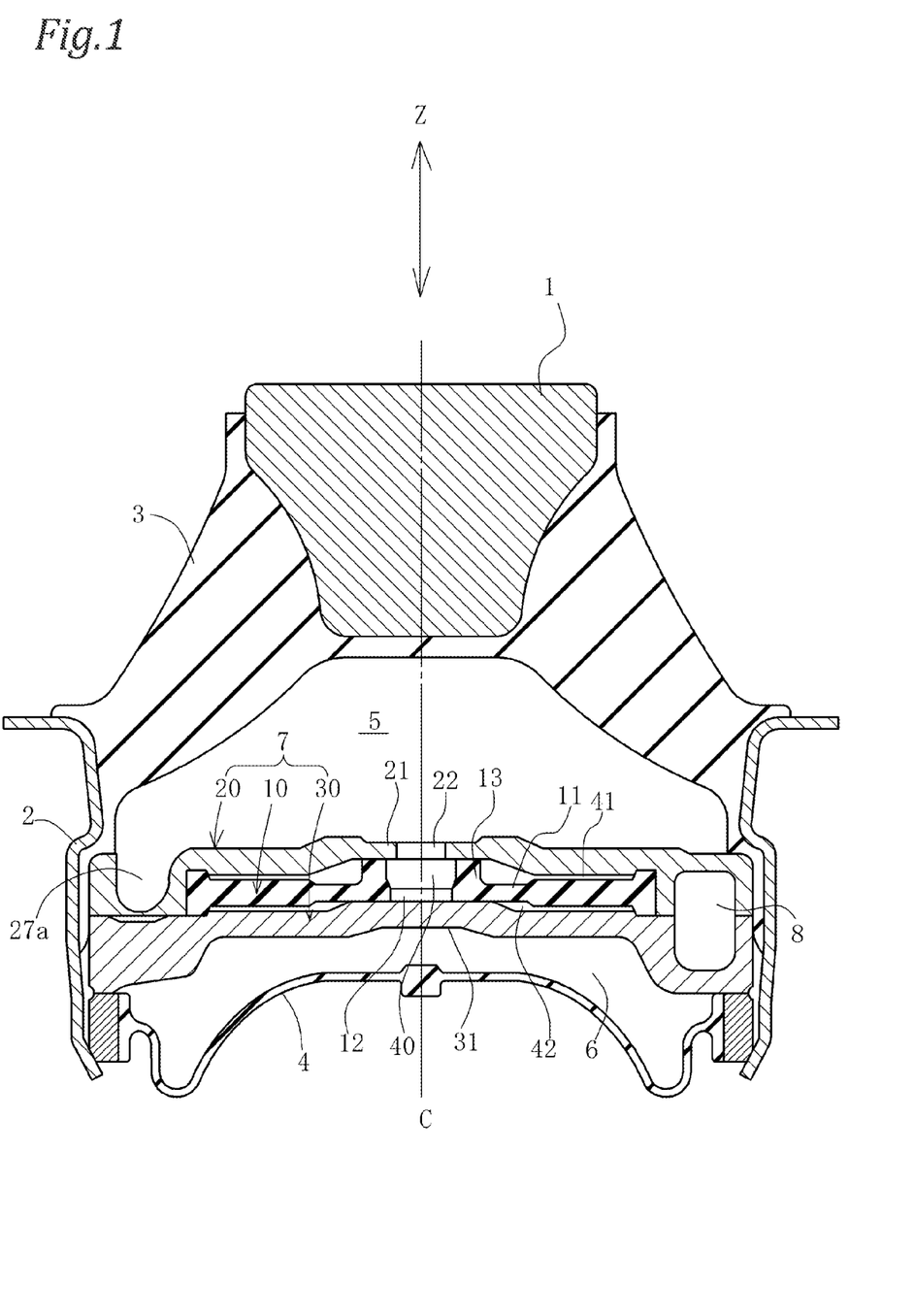
FIG. 1 is a cross sectional view taken on line 1-1 of FIG. 3.
Figure 2:
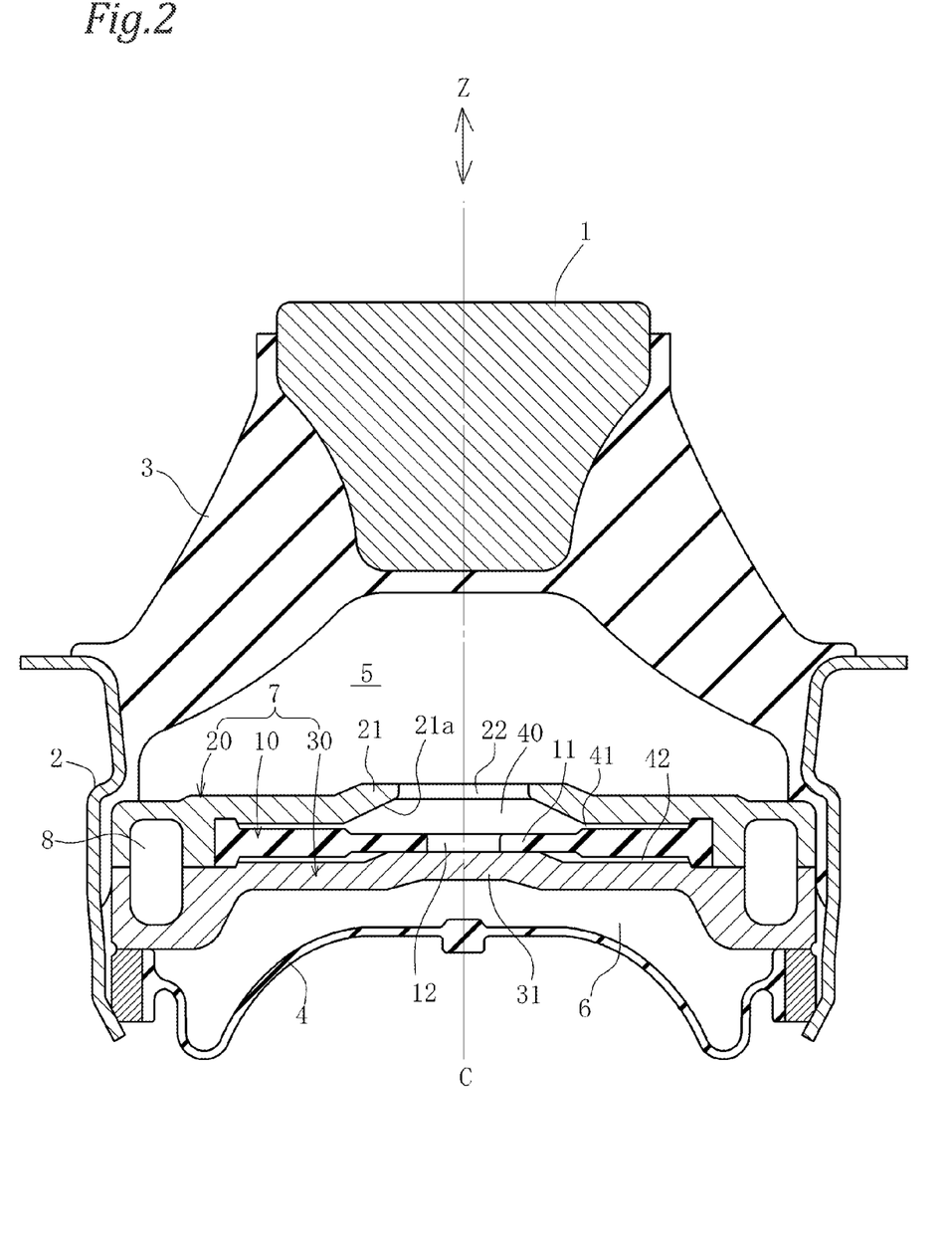
FIG. 2 is a cross sectional view taken on line 2-2 of FIG. 3.
Figure 3:
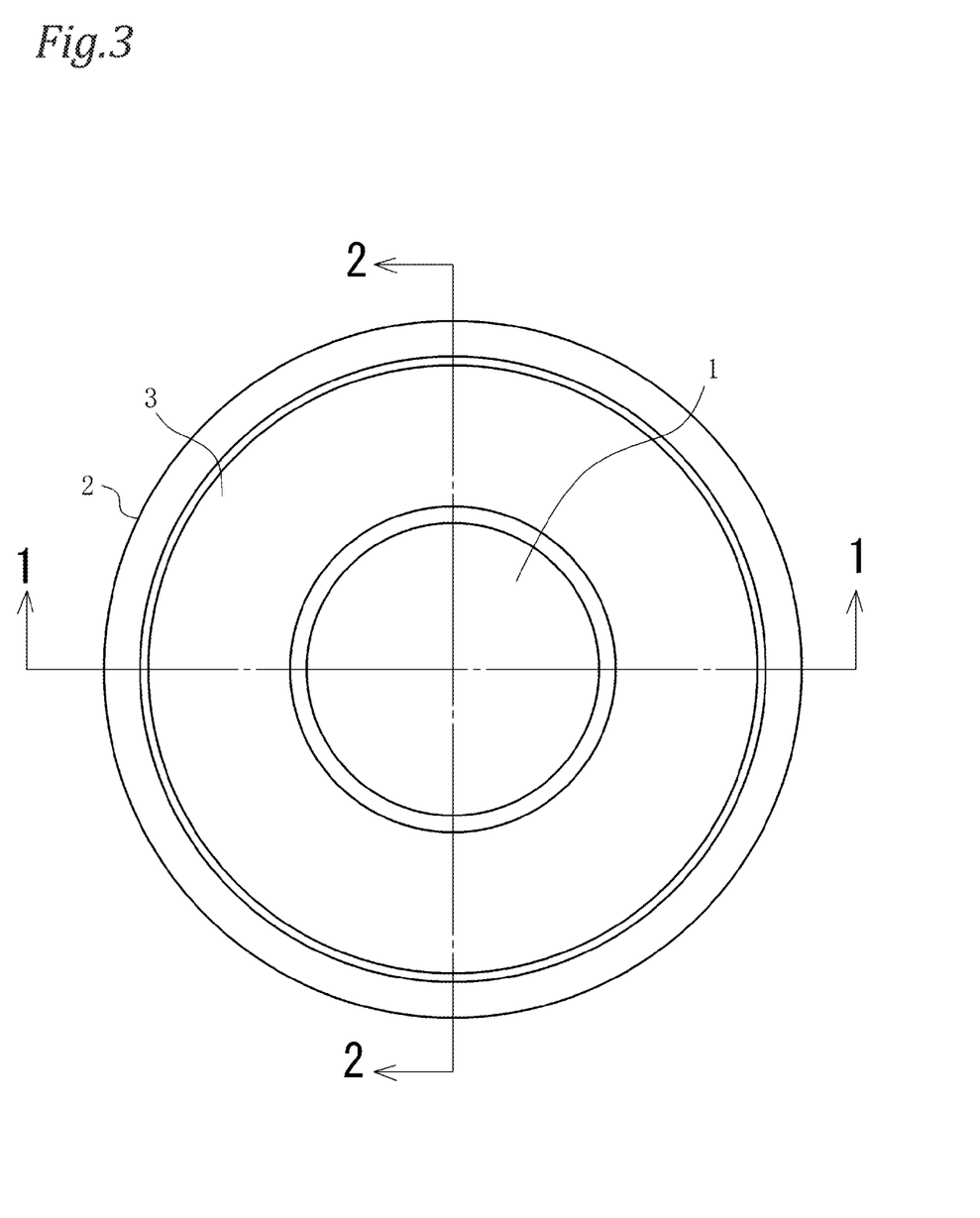
FIG. 3 is a plan view of an engine mount.
Figure 4:
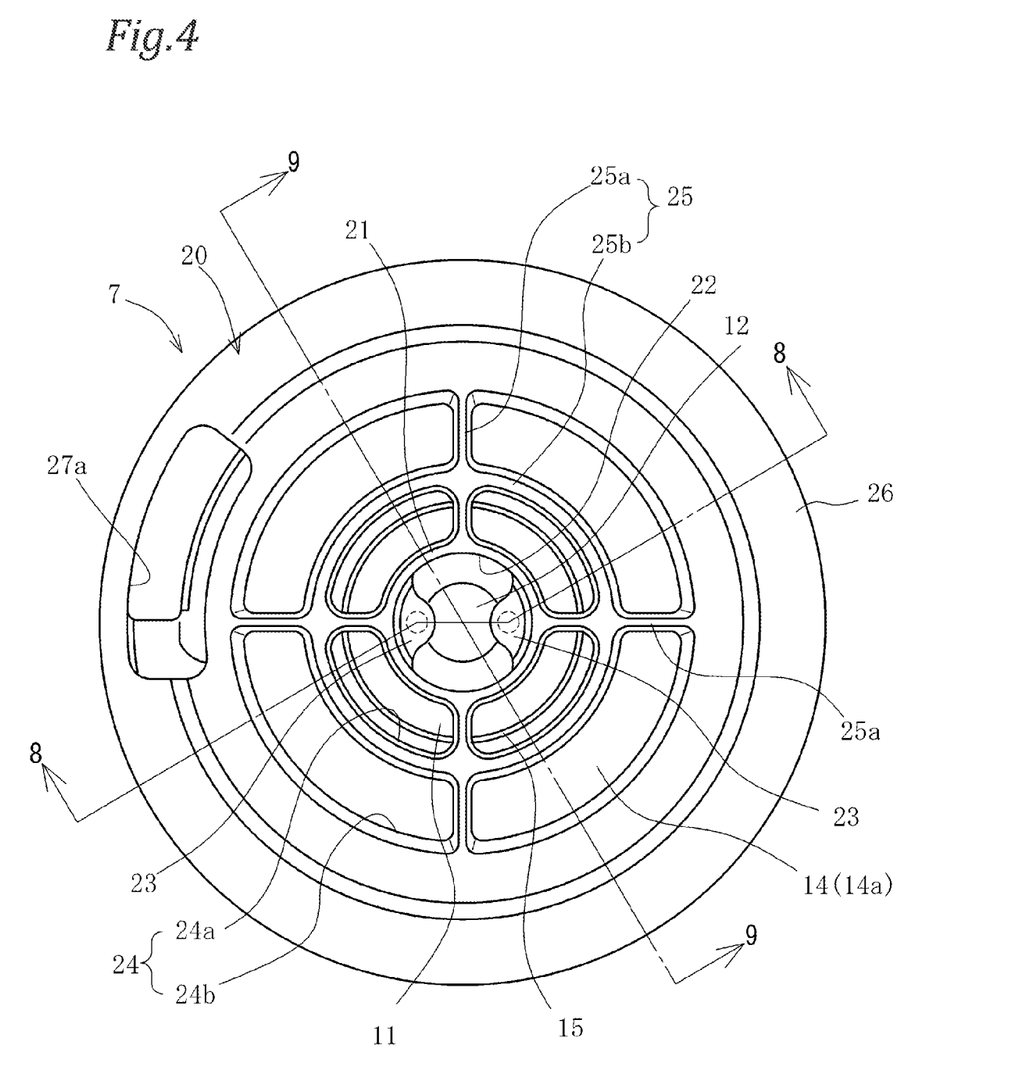
FIG. 4 is a plan view of a partition member.
Figure 5:
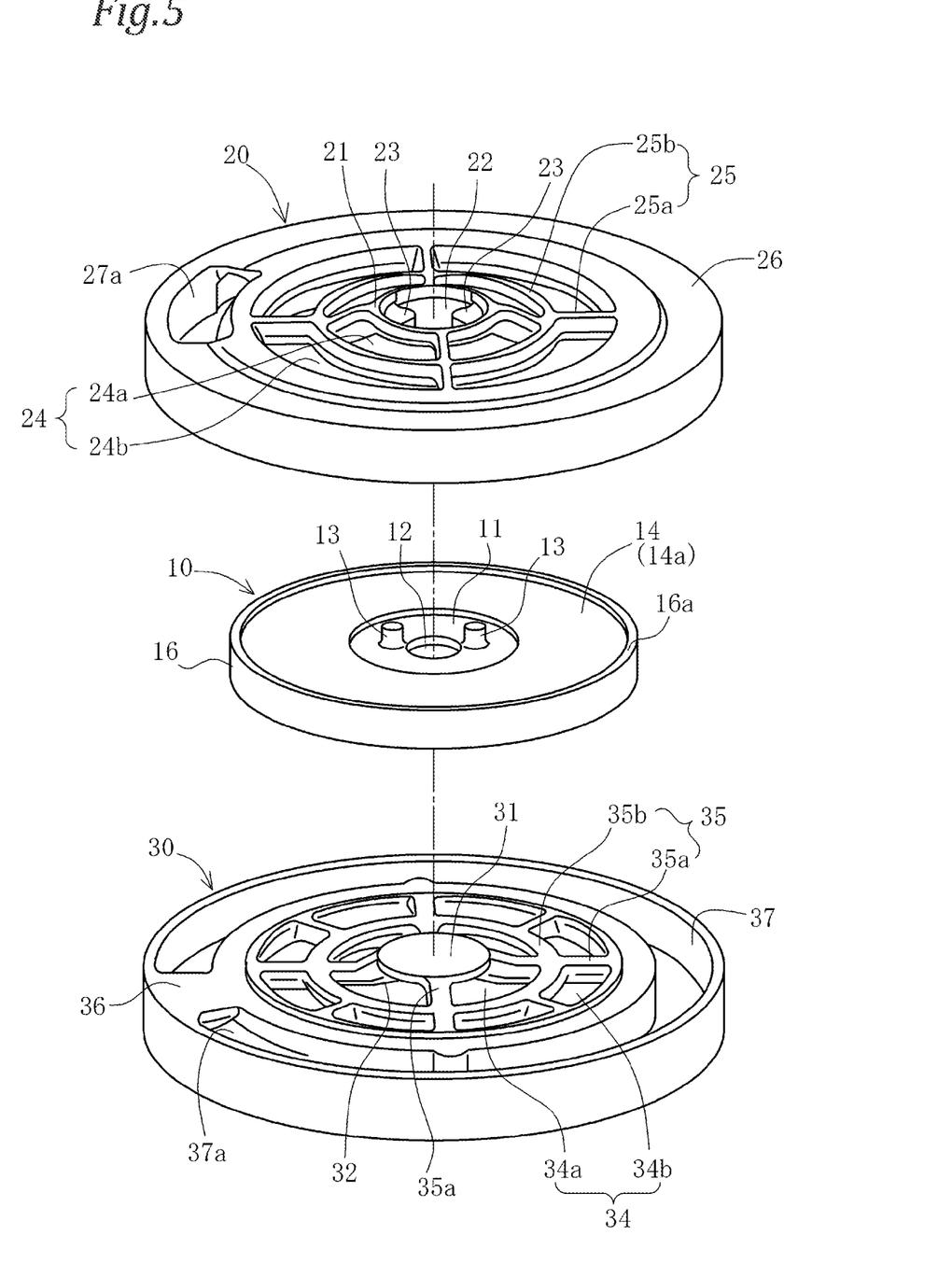
FIG. 5 is an exploded perspective view of each of component parts of the partition member.
Figure 6:
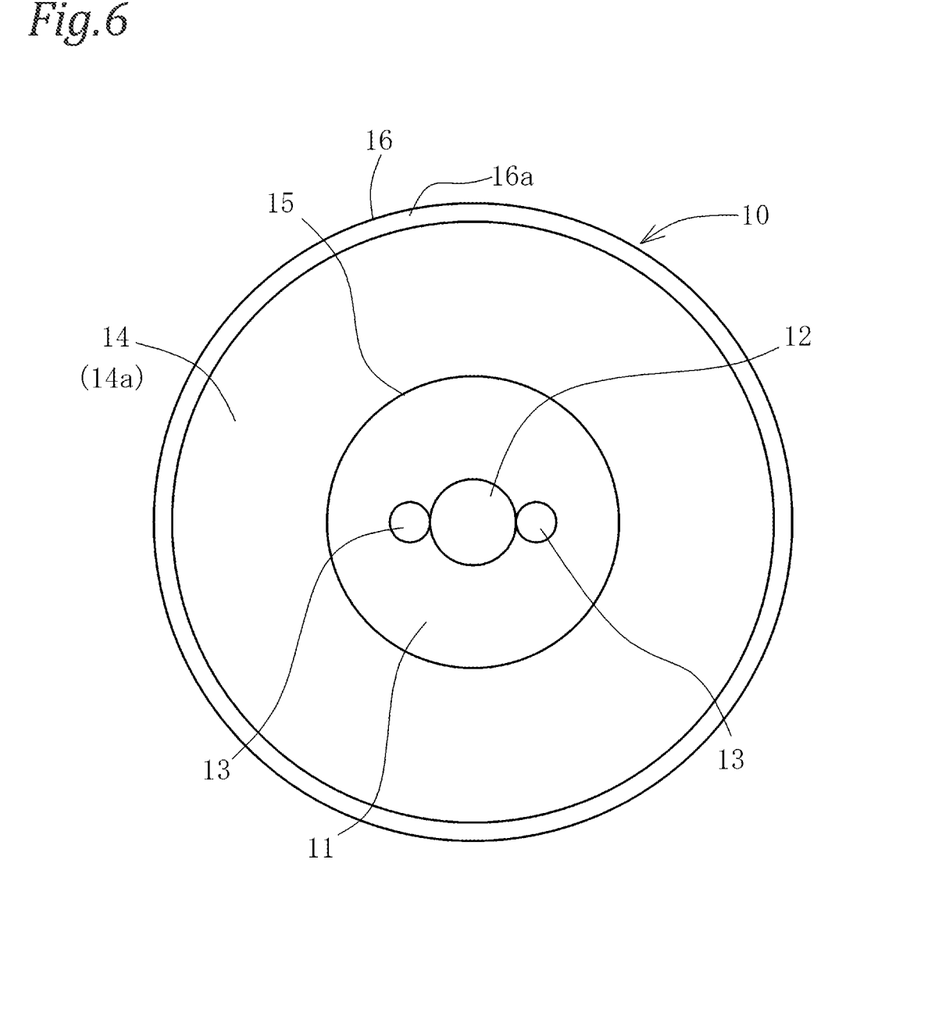
FIG. 6 is a plan view of an elastic diaphragm.
Figure 7:
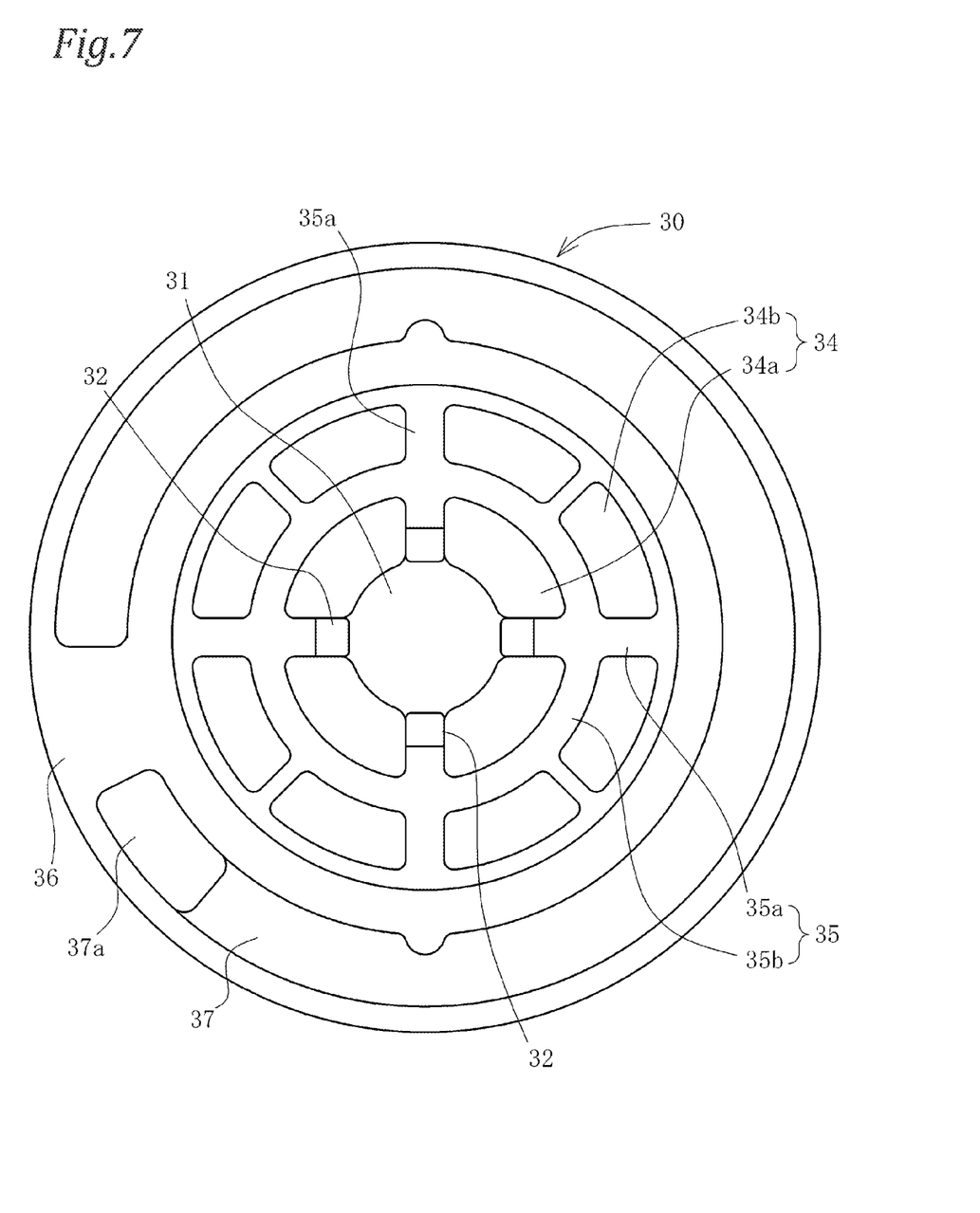
FIG. 7 is a plan view of a lower holder.
Figure 8:
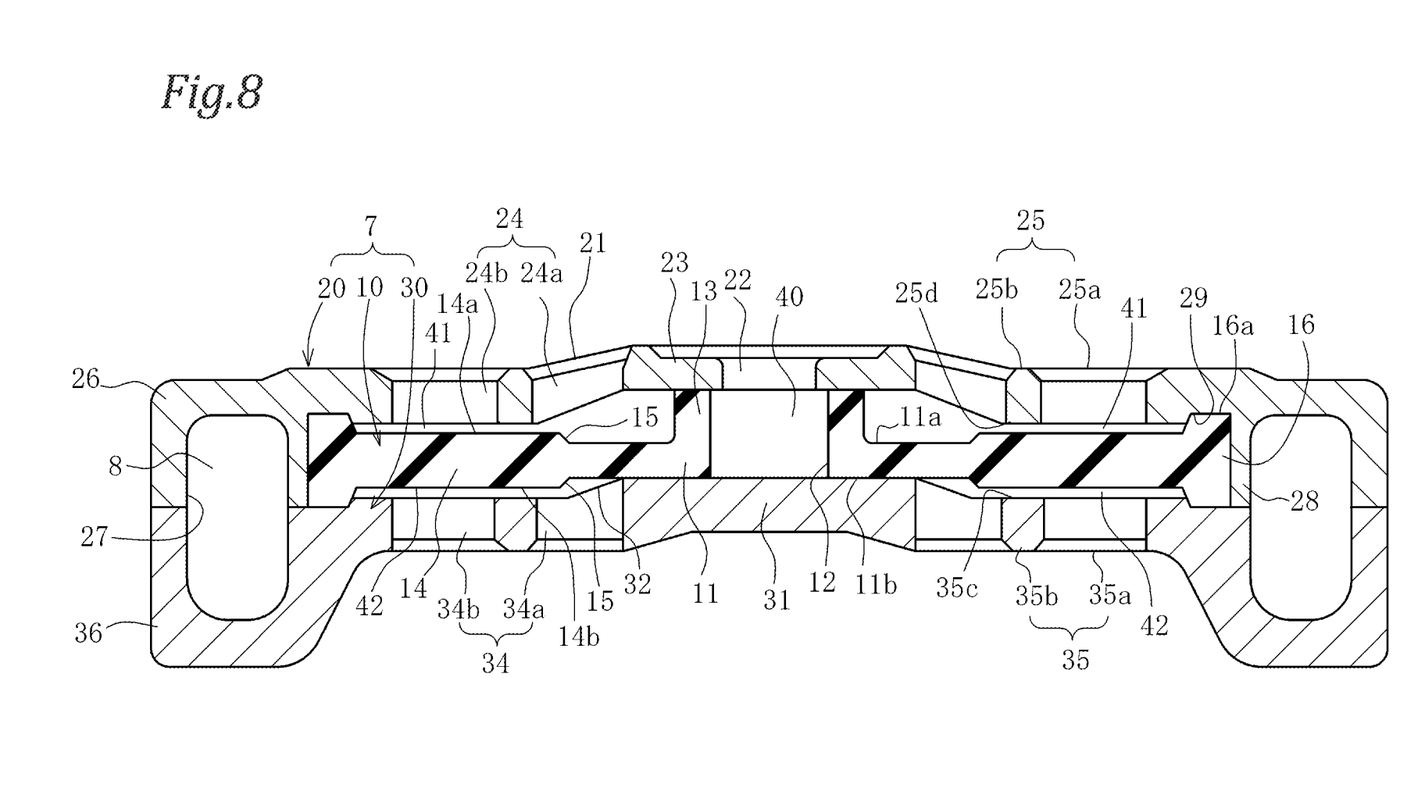
FIG. 8 is a cross sectional view taken on line 8-8 of FIG. 4.
Figure 9:
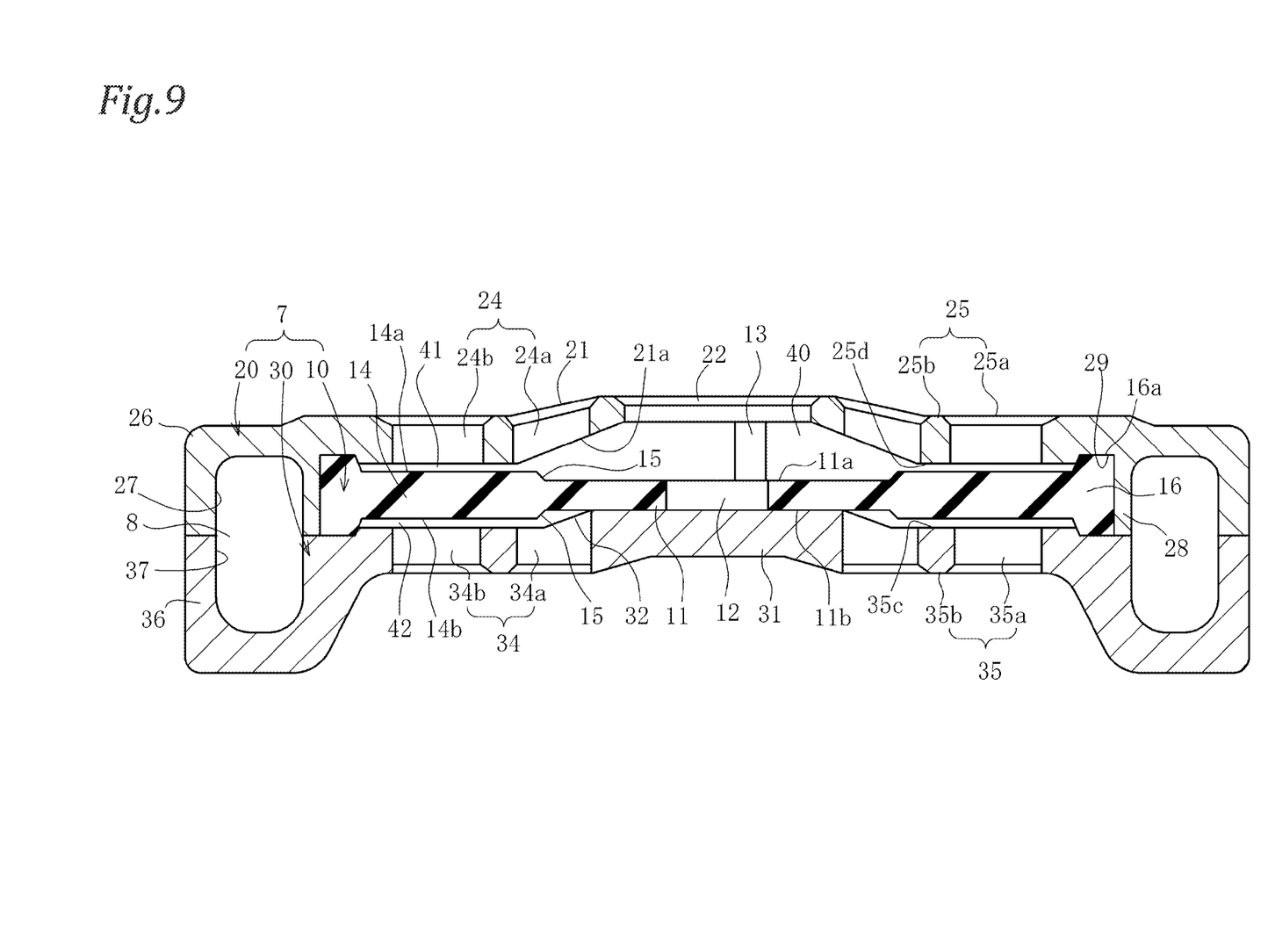
FIG. 9 is a cross sectional view taken on line 9-9 of FIG. 4.
Figure 10:
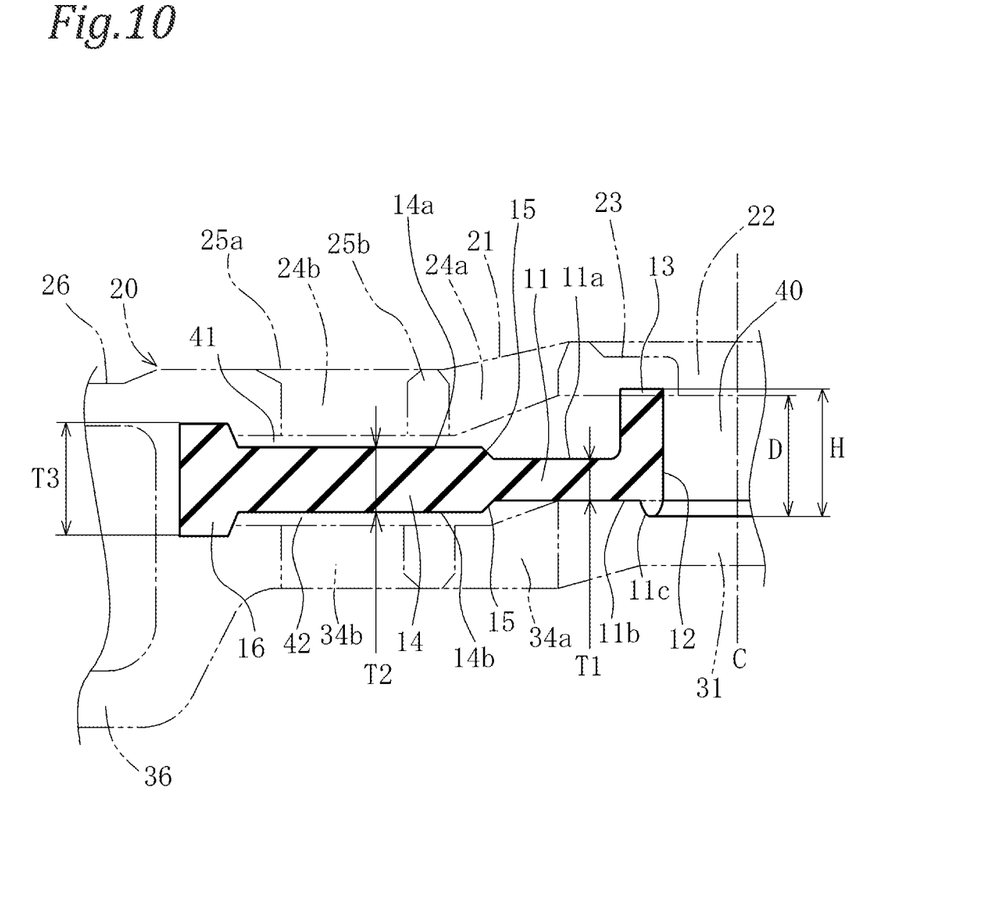
FIG. 10 is an enlarged cross sectional view of a part of the elastic diaphragm.
Figure 11:
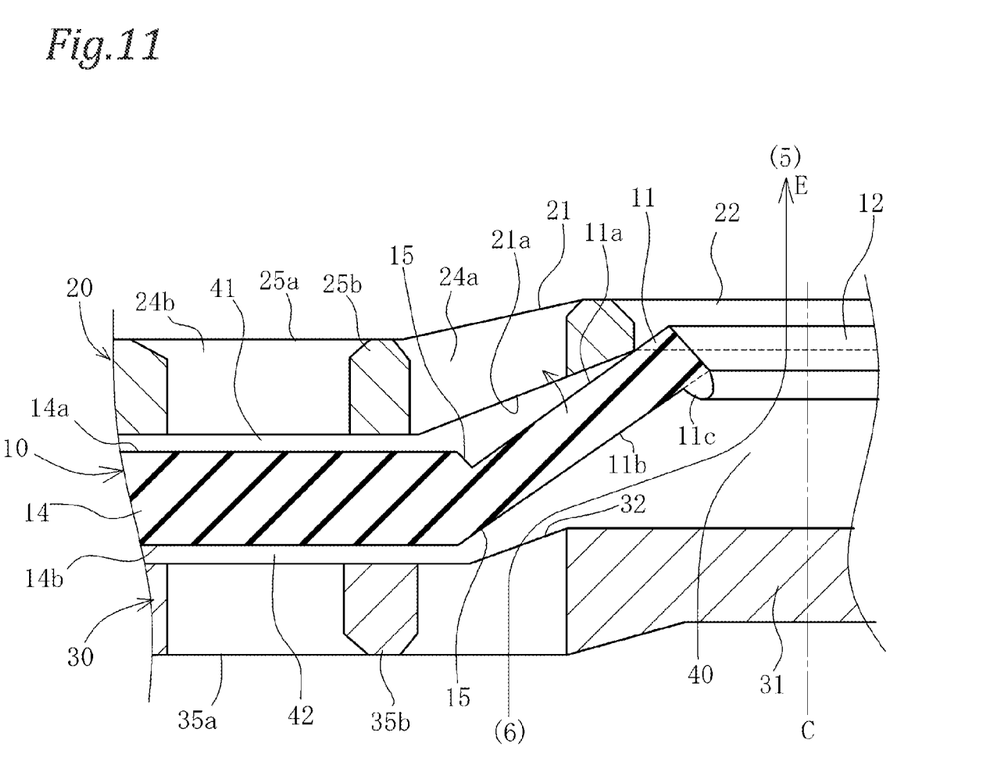
FIG. 11 is an enlarged cross sectional view of a part around a relief valve for explaining the operation thereof.

Hereinafter, an embodiment embodied as a liquid sealed engine mount will be explained with reference to the accompanying drawings. FIGS. 1 and 2 are vertical cross sectional views taken along a mount axis C, wherein FIG. 1 is a cross sectional view taken on line 1-1 of FIG. 3, and FIG. 2 is a cross sectional view taken on line 2-2 of FIG. 3. FIG. 3 is a plan view of the liquid sealed engine mount. FIG. 4 is a plan view of a partition member 7. FIG. 5 is an exploded perspective view of each of component parts of the partition member 7. FIG. 6 is a plan view of an elastic diaphragm. FIG. 7 is a plan view of a lower holder. FIG. 8 is a cross sectional view taken on line 8-8 of FIG. 4. FIG. 9 is a cross sectional view taken on line 9-9 of FIG. 4. FIG. 10 is an enlarged cross sectional view of a part of the elastic diaphragm. FIG. 11 is a partial cross sectional view of assistance in explaining the operation.

Referring to FIGS. 1 to 3, the liquid sealed engine mount comprises a first mounting metal fixture 1 to be mounted on an engine side as a vibration source, a second mounting metal fixture 2 to be mounted on a vehicle body side as a vibration transmitted side, a rubber insulator 3 adapted to cover an opening of one end of the second mounting metal fixture 2 and elastically connecting the first mounting metal fixture 1 and the second mounting metal fixture 2, a diaphragm 4 for covering an opening of the other end of the second mounting metal fixture 2, a liquid chamber having a hermetically sealed space formed by the above component members, a partition member 7 for partitioning the liquid chamber into a primary liquid chamber 5 and a secondary liquid chamber 6, and an orifice 8 provided in the partition member 7 to communicate between the primary liquid chamber 5 and the secondary liquid chamber 6.

The main vibration is inputted in a Z direction extending in parallel with a mount axis C which is a central axis of the liquid sealed engine mount. The vibration going downward in FIG. 1 is a positive pressure side vibration which pressurizes the primary liquid chamber 5, while the vibration going upward is a negative pressure side vibration which reduces pressure within the primary liquid chamber 5. When these positive pressure side and negative pressure side vibrations are inputted alternately, the primary liquid chamber 5 is expanded and contracted repeatedly, and hydraulic liquid moves between the primary liquid chamber 5 and the secondary liquid chamber 6 through the orifice 8, so that liquid column resonance occurs at a predetermined resonance frequency thereby to realize high damping.

Next, the partition member 7 will be explained in detail. The partition member 7 is formed in a circular shape as shown in FIG. 4 and includes an elastic diaphragm 10, an upper holder 20 as an upper side member and a lower holder 30 as a lower side member which are integrated into a single structural member in such a way as to hold an outer peripheral portion of the elastic diaphragm 10 at an upper and lower sides thereof between the upper holder 20 and the lower holder 30, as shown in FIG. 5.

As shown in FIGS. 5, 6 and 8 to 10, the elastic diaphragm 10 is made of flexible and soft elastic materials such as rubber and the like and integrally provided at a central section thereof with a relief valve 11. A relief hole 12 is formed in and extends through a center of the relief valve 11. The relief valve 11 is a circular thin-walled portion of the elastic diaphragm 10 so formed as to surround the relief hole 12 concentrically.

On a lower surface 11b of the relief valve 11 there is integrally provided a seal projection 11c which projects downwardly and surrounds the relief hole 12 in an annular fashion (see FIGS. 10 and 11). When the relief valve 11 is seated on a seal section 31, namely, in a closed condition of the relief valve, the seal projection 11c ensures the seal between the lower surface 11b of the relief valve 11 and an upper surface of the seal section 31 whereby to prevent a leak.

By the way, in FIGS. 8 and 9 which show the seated condition of the relief valve 11, the seal projection 11c is crushed and the lower surface 11b of the relief valve 11 closely contacts the upper surface of the seal section 31, so that the seal projection 11c is not visible.

A plurality (two in this embodiment) of pressing projections 13 integrally project upwardly on the relief valve 11 at regular intervals in a circumferential direction. Plural pressing projections 13 will suffice and the number is not limited to two. Three, four or more pressing projections may be optionally provided.

A tip end portion of the pressing projection 13 projecting toward the primary liquid chamber 5 side is pressed on a lower surface of a projection support section 23 of the upper holder 20 to be referred to later (see FIG. 8). The pressing projection 13 is compressed in a lengthwise direction thereof when being pressed, and biases or presses the lower surface 11b of the relief valve 11 against the upper surface of the seal section 31.

The outer circumference of the relief valve 11 is thicker than the relief valve 11 so as to form a main body section 14. The main body section 14 functions by the elastic deformation thereof as an internal pressure absorption diaphragm which absorbs the internal pressure of the primary liquid chamber 5. There are steps 15 in the boundary region between the main body section 14 and the relief valve 11. An outer periphery of the main body section 14 is integrally provided with a fixing section 16 which is thicker than the main body section 14.

As shown in FIG. 10, the thickness of the elastic diaphragm 10 varies such that the relief valve 11 is T1, the main body section 14 is T2 and the fixing section 16 is T3 (T1<T2<T3). The steps are formed by the changes in thickness of the relief valve 11 and the main body section 14. The thickness T1 of the relief valve 11 is configured to be elastically deformed only at the negative pressure side vibration when the excessive vibration is inputted.

The steps 15 are formed each in the boundary region between an upper surface 14a of the main body section 14 and an upper surface 11a of the relief valve 11 and in the boundary region between a lower surface 14b of the main body section 14 and the lower surface 11b of the relief valve 11.

A projecting height (a projecting amount from the lower surface 11b of the relief valve 11) of the pressing projection 13 is configured to be H which is a little greater than a distance D between the lower surface of the projection support section 23 of the upper holder 20 and the upper surface of the seal section 31.

As shown in FIGS. 4, 5 and 8 to 10, the upper holder 20 includes a central section 21 located above the relief valve 11. A central opening 22 is formed in a center of the central section 21. The central opening 22 substantially corresponds to the relief hole 12 and is located above the relief hole 12. The central section 21 has such dimensions as to overlap with the relief valve 11 in the upward and downward direction. On a portion of the central section 21 there is formed the projection support section 23 against which the tip end of the pressing projection 13 is pressed from beneath. The projection support section 23 is formed in such a manner that a portion of an inner circumferential portion abutting on the central opening 22 of the central section 21 is stepped downward and protruded substantially horizontally into the central opening 22.

Further, a valve opening restraining portion 21a is formed on a lower surface of the central section 21. This valve opening restraining portion 21a is formed as an inclined guide surface, of which an inside in a radial direction is inclined upwardly. When the relief valve 11 is opened, it is deformed to lie parallel to the valve opening restraining portion 21a thereby to prevent the excessive deformation.

Incidentally, a tip portion of the valve opening restraining portion 21a which is a radially inward circumferential end portion thereof corresponds to a base portion of the projection support section 23. The projection support section 23 is protruded substantially horizontally from the tip portion of the valve opening restraining portion 21a in the radially inward direction. Accordingly, a distance between the tip portion of the valve opening restraining portion 21a and the upper surface of the seal section 31 is substantially the same as the distance D.

An opening angle of the relief valve 11 is regulated by an angle of inclination of the valve opening restraining portion 21a, and this angle of inclination can be optionally determined.

The circumferential portion of the central section 21 overlapping with the main body section 14 forms an upper elastic deformation restraining section 25 which has a communicating aperture 24. The upper elastic deformation restraining section 25 comprises a cross-shaped radial rib 25a and a circumferential rib 25b which surrounds in concentric circles the circumference of the central opening 22. The communicating aperture 24 is partitioned by the circumferential rib 25b into an inner circumferential part 24a and an outer circumferential part 24b in the radial direction.

An outer peripheral section 26 is formed on the outer circumferential side of the upper elastic deformation restraining section 25. The radial rib 25a connects integrally the central section 21 and the outer peripheral section 26. The outer peripheral section 26 is located radially outwardly relative to the fixing section 16 of the elastic diaphragm 10. The outer peripheral section 26 has a downwardly opened substantially U-shaped cross section, and an orifice groove 27 is formed throughout substantially the circumference of the outer peripheral section 26. On an end portion of the orifice groove 27 there is provided a primary liquid chamber side opening 27a which pierces the outer peripheral section 26.

An inner and outer circumferential walls of the orifice groove 27 are protruded below a lower surface 25d of the radial rib 25a. On a base portion of the inner circumferential wall 28 there is formed a circumferential groove 29 into which an upper part of the fixing section 16 is fitted.

As shown in FIGS. 5, 7 and 8 to 10, the lower holder 30 is provided at the center portion thereof with the seal section 31 which closely contacts the relief valve 11. An outer circumferential portion of the seal section 31 is lowered through a step portion 32.

A lower elastic deformation restraining section 35 is provided in a region overlapping with the main body section 14. The lower elastic deformation restraining section 35 comprises a cross-shaped radial rib 35a and a circumferential rib 35b which surrounds in concentric circles the circumference of the seal section 31. The communicating aperture 34 is partitioned by the circumferential rib 35b into an inner circumferential part 34a and an outer circumferential part 34b in the radial direction.

An outer peripheral section 36 is formed on the outer circumferential side of the lower elastic deformation restraining section 35. The radial rib 35a connects integrally the seal section 31 and the outer peripheral section 36. The outer peripheral section 36 is a thick wall portion which is protruded downwardly below the outer circumferential portion of the lower elastic deformation restraining section 35, and an orifice groove 37 is formed in the outer peripheral section 36.

The orifice groove 37 has an upwardly opened substantially U-shaped cross section and is formed throughout substantially the circumference of the outer peripheral section 36. The outer peripheral section 36 has substantially the same length as the outer peripheral section 26, and, when the upper holder 20 is placed face to face with the lower holder 30, the single orifice 8 is formed by the outer peripheral section 26 and the outer peripheral section 36. On an end portion of the orifice groove 37 there is provided a secondary liquid chamber side opening 37a which pierces the outer peripheral section 36. An upper surface of the outer peripheral section 36 which is fitted to the inner and outer circumferential walls of the orifice groove 27 is stepped downwardly relative to an upper surface 35c of the lower elastic deformation restraining section 35.

When assembling the partition member 7, as shown in FIGS. 5, 8 and 9, the fixing section 16 of the elastic diaphragm 10 is placed on the lower surface of the upper holder 20, and an upper portion 16a of the fixing section 16 is engaged with the circumferential groove 29 so as to be fixed in position. Then, the upper surface of the lower holder 30 is placed on the lower surface of the elastic diaphragm 10, and the outer peripheral section 26 is fitted to the outer peripheral section 36. Thereafter, the upper holder 20 and the lower holder 30 are united with each other by a proper method such as caulking and the like. As a result, the orifice groove 27 and the orifice groove 37 are joined vertically to form the orifice 8. The upper portion of the fixing section 16 is fitted into the circumferential groove 29 and the lower end portion thereof is pressed against the upper surface of the outer peripheral section 36 to be fixed thereon. In such a way, the all components are integrated into a single structural member.

At that time, the relief hole 12, the central opening 22 and the seal section 31 are overlapped concentrically. The relief valve 11 is supported on the seal section 31, and the upper end of the pressing projection 13 is pressed against the projection support section 23. Since the distance D between the lower surface of the projection support section 23 and the upper surface of the seal section 31 is a little smaller than the projecting height H of the pressing projection 13, the pressing projection 13 is compressed and the lower surface 11b of the relief valve 11 is firmly pressed on the seal section 31 to ensure the liquid sealed condition. Then, there is established the valve closed condition in which the relief hole 12 is closed by the seal section 31.

By the way, the pressing projection 13 is always pressed against the projection support section 23 irrespective of whether the primary liquid chamber 5 is the positive pressure or the negative pressure, so that the relief valve 11 is biased and pressed against the seal section 31.

In addition, the inner circumferential part 24a of the communicating aperture 24 and the inner circumferential part 34a of the communicating aperture 34 are overlapped at the upper and lower sides of the relief valve 11. Moreover, at the upper and lower sides of the main body section 14, there are overlapped a portion of the inner circumferential part 24a and the outer circumferential part 24b, and a portion of the inner circumferential part 34a and the outer circumferential part 34b.

In this assembled state, as shown in FIGS. 8 and 9, a valve liquid chamber 40 is formed between the relief valve 11 and the central section 21 of the upper holder 20. Further, a gap is provided between the lower surface 25d of the upper restraining section and the upper surface 14a of the main body section, and an upper liquid chamber 41 is defined by this gap. There is also provided a gap between the upper surface 35c of the lower restraining section and the lower surface 14d of the main body section 14, and a lower liquid chamber 42 is defined by this gap.

As shown in FIGS. 1 and 2 as well, the valve liquid chamber 40 communicates through the central opening 22 with the primary liquid chamber 5. As shown in FIGS. 8 and 9 in detail, the upper liquid chamber 41 communicates with the valve liquid chamber 40, and it is also in communication with the primary liquid chamber 5 through the inner circumferential part 24a and the outer circumferential part 24b of the communicating aperture 24.

Furthermore, the lower liquid chamber 42 communicates with the secondary liquid chamber 6 through the inner circumferential part 34a and the outer circumferential part 34b of the communicating aperture 34. Moreover, in the valve opened condition where the relief hole 12 is brought out of contact with the seal section 31, it is also in communication with the valve liquid chamber 40 through the relief hole 12, whereby to enable the leak by liquid movement from the secondary liquid chamber 6 to the primary liquid chamber 5. However, in the valve closed condition where the relief valve 11 comes in close contact with the seal section 31 thereby to close the relief hole 12, the communication with the valve liquid chamber 40 is cut off. Thus, a passage between the lower liquid chamber 42 and the valve liquid chamber 40 is opened and closed by the relief valve 11.

Further, the main body section 14 faces the primary liquid chamber 5 and the secondary liquid chamber 6 through the communicating apertures 24 and 34 since there are the gaps between the main body section 14 and each of the upper elastic deformation restraining section 25 and the lower elastic deformation restraining section 35. Therefore, the main body section 14 is elastically deformed by the change of the internal pressure of the primary liquid chamber 5 so as to be allowed to absorb the change of the internal pressure. At the time of a predetermined large vibration input, the main body section 14 is biased or pressed against the radial ribs 25a, 35a and the circumferential ribs 25b, 35b, whereby the deformation of the main body section 14 is restrained.

Next, the operation will be explained. FIGS. 8 to 10 show a closed state of the relief valve 11 when the normal vibration is inputted, and FIG. 11 is an enlarged cross sectional view showing an opened state of the relief valve 11 when the excessive vibration is inputted.

At first, in the closed state shown by FIGS. 8 to 10, the relief valve 11 closely contacts the seal section 31 and the relief hole 12 is closed with the seal section 31. Therefore, since the passage between the lower liquid chamber 42 and the valve liquid chamber 40 is blocked by the relief valve 11, the leak from the secondary liquid chamber 6 via the relief hole 12 to the primary liquid chamber 5 and the leak by the opposite route are not caused.

Namely, although the hydraulic liquid within the primary liquid chamber 5 moves between the valve liquid chamber 40 and the upper liquid chamber 41 via the central opening 22 and the communicating aperture 24, it is not capable of moving from the relief hole 12 to the lower liquid chamber 42 so that the leak to the secondary liquid chamber 6 is not caused.

In addition, although the hydraulic liquid within the secondary liquid chamber 6 moves into the lower liquid chamber 42 via the communicating aperture 34, it is not capable of moving into the relief hole 12 so that the leak to the primary liquid chamber 5 is not caused.

In the closed state of the relief valve 11, there is not caused the movement of the hydraulic liquid between the primary liquid chamber 5 and the secondary liquid chamber 6 through the relief hole 12. When the main body section 14 is elastically deformed in proportion to the internal pressure fluctuation of the primary liquid chamber 5 by inputting the vibration less than the predetermined large vibration, the elastic diaphragm 10 absorbs the internal pressure fluctuation of the primary liquid chamber 5 thereby to effect the reduction in dynamic spring. Moreover, when the predetermined large vibration is inputted, the main body section 14 is restrained from the elastic deformation greater than the predetermined degree by the upper elastic deformation restraining section 25 and the lower elastic deformation restraining section 35, so that the orifice 8 causes the liquid column resonance thereby to accomplish the high damping.

FIG. 11 is an enlarged view of a part having a cross section similar to FIG. 8, showing an abnormal vibration inputted state in the cavitation occurring condition. When turning to the negative pressure side after the excessive positive side vibration is inputted, a large difference in hydraulic pressure is developed between the primary liquid chamber 5 and the secondary liquid chamber 6, so that the hydraulic liquid within the lower liquid chamber 42 pushes the relief valve 11 upwardly and enters the space between the lower surface of the relief valve 11 and the upper surface of the seal section 31.

Then, the inner circumferential surface part of the relief valve 11 is deformed in such a way as to be lifted up. This lifting-up deformation is easily effected since the relief valve 11 is thin. When a portion is lifted up, the lifting-up deformation is rapidly transmitted, while being preceded by this portion, to the surrounding portion, and the whole of the relief valve 11 moves upwardly away from the seal section 31 so as to be opened. At that time, the relief valve 11 is opened along the inclined surface of the valve opening restraining portion 21a and pressed against the valve opening restraining portion 21a.

By this opening of the relief valve 11, the hydraulic liquid within the secondary liquid chamber 6 leaks, as shown by an arrow E, through the route of the communicating aperture 34→the lower liquid chamber 42→the relief hole 12→the central opening 22→(the communicating aperture 24)→the primary liquid chamber 5, whereby the negative pressure of the primary liquid chamber 5 is settled rapidly to restrain the occurrence of the cavitation.

Moreover, since this opening of the relief valve 11 is carried out rapidly and smoothly, the time lag from the cavitation occurring condition to the start of leak is reduced, whereby the cavitation can be assuredly prevented without delay in timing.

By the way, although the pressing projections 13 function as the resistance relative to the opening movement of the relief valve 11, these are formed at spaced intervals in the circumferential direction, so that the preceding lifting-up deformation is effected between the respective pressing projections 13 without elastic deformation of the pressing projections 13. Thereafter, although the pressing projections 13 are deformed by compression when the whole of the relief valve 11 is opened, this deformation by compression is effected by the strong pushing-up force due to the flowing out of a large amount of the hydraulic liquid into the primary liquid chamber 5 from the preceding lifting-up. Therefore, the deformation by compression of the pressing projections 13 may be neglected as the resistance to the opening of the relief valve 11 and has no influence on an area of the opening when the relief valve 11 is opened.

In addition, in this embodiment, since only two pressing projections 13 are provided diagonally, a region of the relief valve 11 pressed by both of the pressing projections 13 is highest in rigidity, while an intermediate region in the circumferential direction between both of the pressing projections 13 is lowest in rigidity. As the difference in the rigidity becomes conspicuous, the hydraulic liquid is first converged on the lowest region in the rigidity. Therefore, it is possible to cause the preceding lifting-up deformation more assuredly and rapidly, and the area of the opening when the valve is opened can be maximized.

Further, since the pressing projections 13 function as a return spring when the relief valve 11 is returned to the closed position, the leak more than it is needed can be prevented by the rapid return.

In addition, since the upper holder 20 is provided with the valve opening restraining portion 21a, the excessive deformation of the relief valve 11 when it is opened is restrained by the valve opening restraining portion 21a. Therefore, the return to the closed position of the relief valve 11 can be rapidly performed by preventing the excessive deformation of the relief valve 11 at the time of the opening thereof. Since the excessive deformation is prevented, the relief valve 11 can be formed so flexible as to be opened rapidly.

Further, since the elastic deformation restraining sections 25 and 35 for restraining the elastic deformation of the main body section 14 greater than the predetermined degree are provided on the upper holder 20 and the lower holder 30, the main body section 14 is not elastic deformed greater than the predetermined degree. As a result, even if the relief valve 11 is provided integral with the main body section 14, it does not have an influence on the closed condition of the relief valve 11, and the closed condition thereof can be stabilized.

Figure 12:
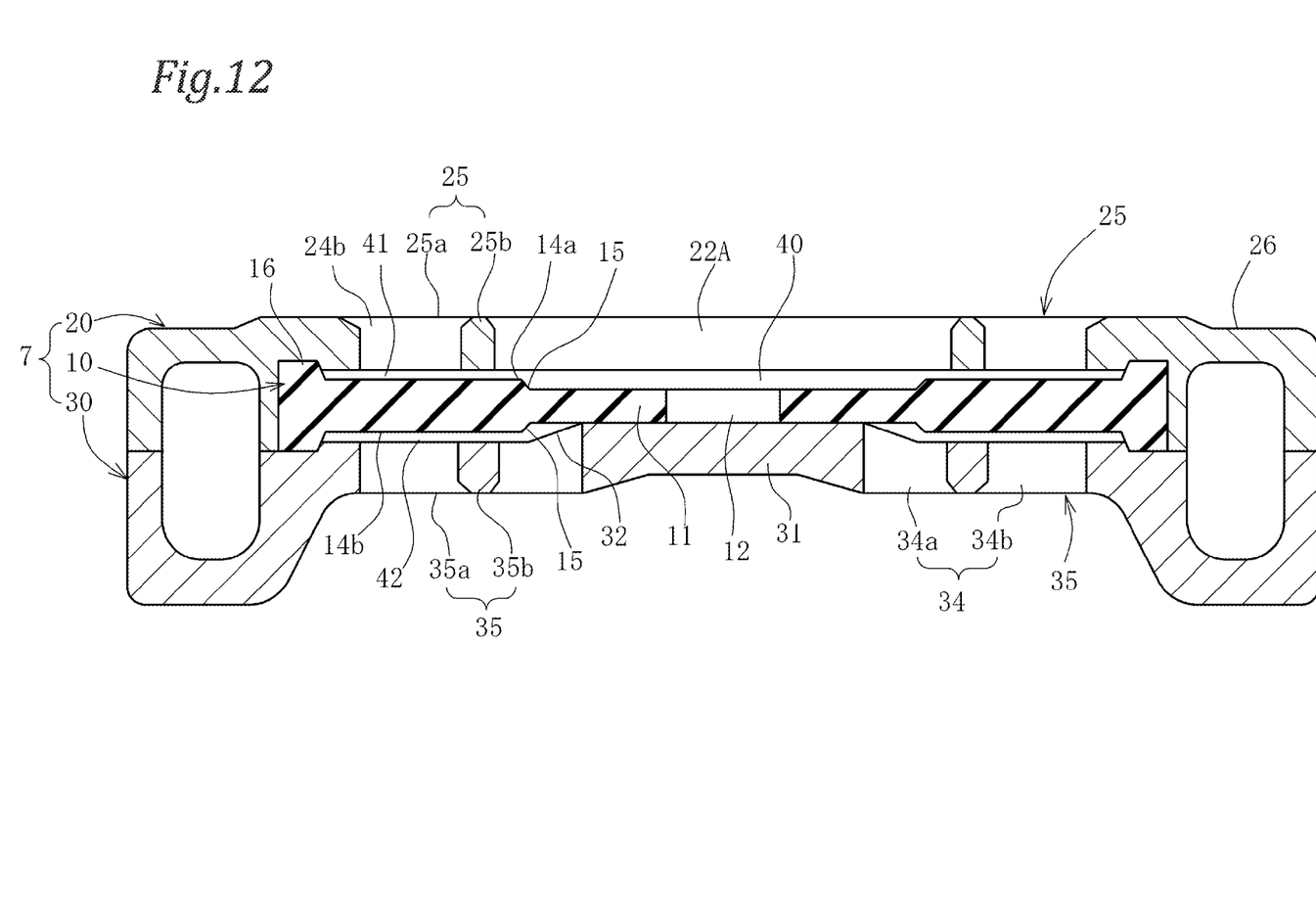
FIG. 12 is a cross sectional view similar to FIG. 8 showing a modification.

FIG. 12 is a modified example. In this modification, the upper holder 20 is provided merely for fixing the fixing section 16 of the elastic diaphragm 10 through the outer peripheral section 26 thereof and for restraining the elastic deformation greater than the predetermined degree of the main body section 14 through the upper elastic deformation restraining section 25. A central opening 22A as a single opening is provided above the relief valve 11 and frees the relief valve 11. Thus, the relief valve 11 is fully open at the central opening 22A. The communicating aperture of the upper elastic deformation restraining section 25 has only the outer circumferential portion 24b.

As constructed above, since there is no need to bias or press the relief valve 11 against upper holder 20 side by the provision of the pressing projection 13, there may be omitted the pressing projection 13, the central section 21, the central opening 22 and the communicating aperture 24.

Accordingly, it is possible to speed up the opening movement of the relief valve 11 as rapidly as the resistance of the pressing projection 13 is reduced. It is also possible to simplify the structure and to save weight.

It is to be understood that the present invention is not limited to each of the above embodiments and that various changes and modifications may be made in the invention without departing from the spirit and the scope thereof. For example, the liquid sealed vibration isolating device is not limited to the engine mount but may be applied to various kinds of devices such as a suspension mount, etc.

What is claimed is:

1. A liquid sealed vibration isolating device comprising:
   a liquid chamber being partitioned into a primary liquid chamber and a secondary liquid chamber by a partition member,
   an orifice being provided in the partition member to communicate between the primary liquid chamber and the secondary liquid chamber, and a relief valve for controlling cavitation being provided in a central portion of an elastic diaphragm, which is provided in the partition member,
   wherein the partition member is formed integrally by holding the elastic diaphragm between an upper holder and a lower holder, wherein the elastic diaphragm is provided at the central portion thereof with the relief valve and integrally provided at an outer peripheral portion thereof with a main body section for absorbing an internal pressure fluctuation of the primary liquid chamber, and the relief valve is formed thinner than the main body section and has a relief hole at a central area thereof, and wherein the lower holder has a seal section provided below the relief valve, and the seal section comes in close contact with the relief valve to close the relief hole, and, when in a cavitation occurring condition the relief valve is brought out of contact with the seal section to open such that a portion around the relief hole of the relief valve is elastically deformed in such a way as to be lifted up, a hydraulic liquid leaks from the secondary liquid chamber through the relief hole to the primary liquid chamber.

2. The liquid sealed vibration isolating device according to claim 1, further comprising pressing projections which project integrally from an upper surface of the relief valve at predetermined intervals in a circumferential direction and which are pressed on a projection support section provided on the upper holder above the relief valve, in such a way as to allow the relief valve to be pressed against the seal section.

3. The liquid sealed vibration isolating device according to claim 1, wherein the upper holder is provided with a valve opening restraining portion for preventing excessive deformation of the relief valve when the relief valve is opened.

4. The liquid sealed vibration isolating device according to claim 1, wherein the upper holder and the lower holder are provided with elastic deformation restraining sections for restraining the main body section of the elastic diaphragm from being elastically deformed greater than a predetermined degree.

5. The liquid sealed vibration isolating device according to claim 1, wherein the upper holder comprises an elastic deformation restraining section for restraining the main body section of the elastic diaphragm from being elastically deformed greater than a predetermined degree, and a single opening formed as a part of the upper holder which is located above the relief valve and radially inwardly from the elastic deformation restraining portion.

6. The liquid sealed vibration isolating device according to claim 2, wherein the upper holder is provided with a valve opening restraining portion for preventing excessive deformation of the relief valve when the relief valve is opened.

7. The liquid sealed vibration isolating device according to claim 2, wherein the upper holder and the lower holder are provided with elastic deformation restraining sections for restraining the main body section of the elastic diaphragm from being elastically deformed greater than a predetermined degree.

8. The liquid sealed vibration isolating device according to claim 3, wherein the upper holder and the lower holder are provided with elastic deformation restraining sections for restraining the main body section of the elastic diaphragm from being elastically deformed greater than a predetermined degree.

9. The liquid sealed vibration isolating device according to claim 6, wherein the upper holder and the lower holder are provided with elastic deformation restraining sections for restraining the main body section of the elastic diaphragm from being elastically deformed greater than a predetermined degree.

\* \* \* \* \*